United States Patent
Sabato et al.

(10) Patent No.: US 8,103,966 B2
(45) Date of Patent: Jan. 24, 2012

(54) SYSTEM AND METHOD FOR VISUALIZATION OF TIME-BASED EVENTS

(75) Inventors: Sivan Sabato, Mazkeret Batya (IL); Aviad Tsherniak, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 796 days.

(21) Appl. No.: 12/025,776

(22) Filed: Feb. 5, 2008

(65) Prior Publication Data
US 2009/0199118 A1 Aug. 6, 2009

(51) Int. Cl.
*G06F 3/048* (2006.01)
*G06F 3/00* (2006.01)

(52) U.S. Cl. ......... 715/810; 715/811; 715/835; 715/844

(58) Field of Classification Search .................. 715/503, 715/810, 811, 828, 835, 844, 723, 731, 765
See application file for complete search history.

(56) References Cited

U.S. PATENT DOCUMENTS

| | | | |
|---|---|---|---|
| 5,195,179 A * | 3/1993 | Tokunaga | 345/159 |
| 5,852,435 A * | 12/1998 | Vigneaux et al. | 345/428 |
| 6,069,606 A * | 5/2000 | Sciammarella et al. | 345/660 |
| 6,332,147 B1 * | 12/2001 | Moran et al. | 715/203 |
| RE38,401 E * | 1/2004 | Goldberg et al. | 715/720 |
| RE38,609 E * | 10/2004 | Chen et al. | 715/730 |
| 6,807,361 B1 * | 10/2004 | Girgensohn et al. | 386/227 |
| 6,839,072 B2 * | 1/2005 | Trajkovic et al. | 715/811 |
| 7,149,974 B2 * | 12/2006 | Girgensohn et al. | 715/723 |
| 7,343,026 B2 * | 3/2008 | Niwa et al. | 382/103 |
| 7,752,301 B1 * | 7/2010 | Maiocco et al. | 709/224 |
| 7,756,722 B2 * | 7/2010 | Levine et al. | 705/2 |
| 7,802,205 B2 * | 9/2010 | Bedingfield | 715/848 |
| 2002/0147805 A1 | 10/2002 | Leshem et al. | |
| 2005/0162384 A1 * | 7/2005 | Yokoyama | 345/156 |
| 2005/0246119 A1 | 11/2005 | Kooladi | |
| 2006/0090141 A1 * | 4/2006 | Loui et al. | 715/764 |
| 2006/0103631 A1 * | 5/2006 | Mashima et al. | 345/158 |
| 2006/0252541 A1 * | 11/2006 | Zalewski et al. | 463/36 |
| 2006/0265249 A1 * | 11/2006 | Follis et al. | 705/3 |
| 2008/0096654 A1 * | 4/2008 | Mondesir et al. | 463/31 |
| 2008/0244453 A1 * | 10/2008 | Cafer | 715/835 |

OTHER PUBLICATIONS

Sandia National Laboratories, "Sisyphus", release 2007. Details at: http://www.cs.sandia.gov/~jrstear/sisyphus/.
Risto Vaarandi, "SLCT, User Commands", updated 2003. http://kodu.neti.ee/~risto/slct/slct.html.
Stephen G. Eick, Michael C. Nelson, and Jerry D. Schmidt. Graphical analysis of computer log files. Commun. ACM, 37(12):50-56, 1994.

(Continued)

*Primary Examiner* — Nicholas Augustine
(74) *Attorney, Agent, or Firm* — Jason Far-Hadia

(57) ABSTRACT

A method for visual representation of time based events in a target system comprises analyzing content related to occurrence of one or more events in a target system, wherein the content comprises information from which type of an event and time of occurrence of the event may be determined; grouping the events into one or more classes according to one or more predefined attributes; and generating a visual presentation of events occurring in a first time range, wherein the time range is selectable by an independent entity.

25 Claims, 3 Drawing Sheets

OTHER PUBLICATIONS

Tetsuji Takada and Hideki Koike. Mielog: A highly interactive visual log browser using information visualization and statistical analysis. In LISA '02: Proceedings of the 16th USENIX conference on System administration, pp. 133-144. USENIX Association, 2002.

Rigoutsos, I. and A. Floratos, Combinatorial Pattern Discovery in Biological Sequences: the TEIRESIAS Algorithm. Bioinformatics, 14(1), Jan. 1998.

* cited by examiner

FIG. 3

SYSTEM AND METHOD FOR VISUALIZATION OF TIME-BASED EVENTS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

TECHNICAL FIELD

The present invention relates generally to a method and system for visualization of time based events.

BACKGROUND

Complex environments including computer systems, software systems, or even mechanical systems like vehicles include a large number of components and have many configuration parameters and options. In such complex environments, a faulty configuration or component may be difficult to detect, due to the large number of components and parameters involved. Therefore, users and administrators in such environments may review information generated in multiple event logs to identify configuration issues that may cause system problems or explain problems that have already occurred.

Generally, a human operator will have a very difficult time if she is to manually analyze log entries for a complex system, so that she can detect an event that may identify the source of a problem. Automated schemes may be implemented to facilitate or simplify the log analysis process by grouping log events into classes and listing only the class of events instead of the actual events. This scheme provides more of an overview, and thus fails to provide time based event details that may be important.

For example, the user may not be given direct access to the timing information of each single event within each event class and thus time correlations between events of the same class or between different event classes remain hidden from the user. This approach is undesirable in that the information about the relationship and correlation about the events and the time of occurrence of events is often important in system analysis or trouble shooting; and thus missing such details likely results in a less accurate system evaluation.

Other systems use complex visualization techniques to user represent the occurrences of all the events available, but do not group the events into classes, thus making it hard for the user to identify the type of events that occurred in the system and to find correlations between event classes. Accordingly, systems and methods are desirable that can summarize a target system's event log information but at the same time provide an accurate visual representation of the timing details and their respective correlation between events.

SUMMARY

The present invention relates generally to a method and system for visualization of time based events.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

A method for visual representation of time based events in a target system is provided. The method comprises analyzing content related to occurrence of one or more events in a target system, wherein the content comprises information from which type of an event and time of occurrence of the event may be determined; grouping the events into one or more classes according to one or more predefined attributes; and generating a visual presentation of events occurring in a first time range, wherein the time range is selectable by an independent entity.

In one embodiment, the visual presentation includes a graphical representation of a number of events occurring during the first time range. In an alternative embodiment, the visual presentation comprises a graphical representation of types of events occurring during the first time range. The graphical representation of a number or types of events occurring may be associated with a user interface mechanism allowing a user to cause more or less detailed information about an event's nature or time of occurrence to be displayed by way of interacting with the user interface mechanism.

A further embodiment may include updating the visual presentation, in response to the user interacting with the user interface mechanism, to display a graphical representation of the number of events and the types of events occurring during a second time range. The second time range may be a subset of the first time range, and vice versa.

The graphical representation of types of event may also be associated with a value representing either importance of a respective event or the time of occurrence of respective event, and also the combination of both, wherein order in which the events are displayed can be sorted in accordance with the first or the second values.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

FIGS. 2 and 3 illustrate exemplary representations of a graphical user interface that provides information about a target system's time based events, in accordance with one embodiment.

Features, elements, and aspects of the invention that are referenced by the same numerals in different figures represent the same, equivalent, or similar features, elements, or aspects, in accordance with one or more embodiments.

DETAILED DESCRIPTION OF EXAMPLE EMBODIMENTS

Figure 1:
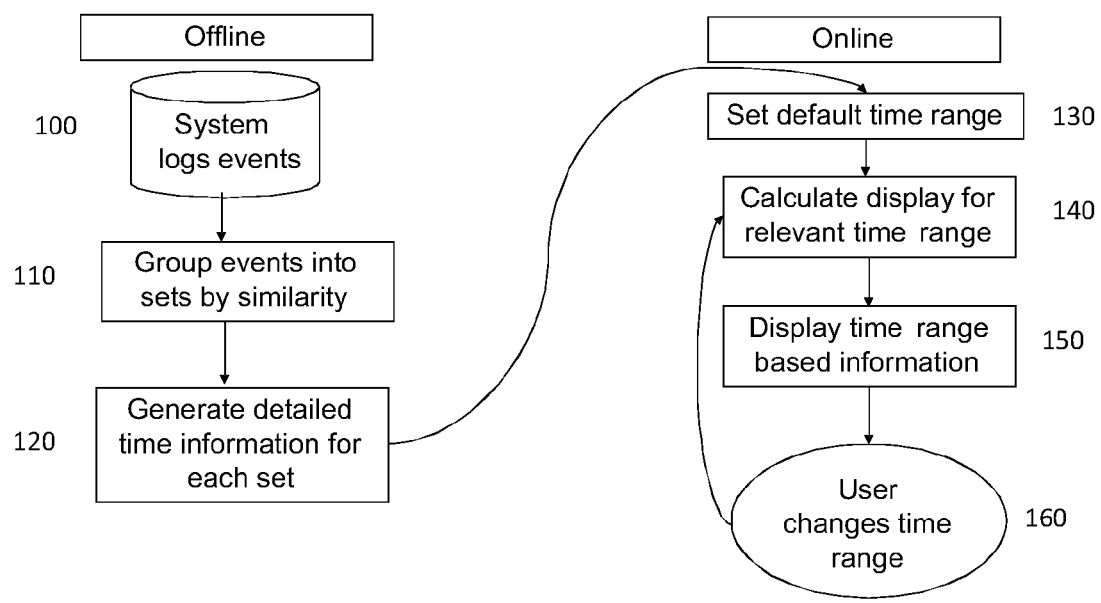
FIG. 1 is a flow diagram of a method for visualization of time based events, in accordance with one embodiment.

Referring to FIG. 1, one or more embodiments may be implemented to operate in two states (e.g., an offline state and an online state). In the first state, data recorded in one or more event logs for a target system is analyzed so that information related to certain events or groups of events can be compiled and provided in a visual manner. In the second state, the compiled information may be presented by way of a graphical user interface, wherein time based information for certain events or groups of events is displayed to a user. A user may interact with the graphical user interface to cause more or less details for a selected time range to be displayed.

It is noteworthy that the dual state implementation shown in FIG. 1 is provided by way of example. As such, different embodiments may be implemented having more or less states or stages, without detracting from the scope of the invention. For the purpose of this disclosure, an event as discussed herein may refer to a visual presentation of an event (e.g. a text message) provided in association with a timestamp representing the time the event occurred. An event class may refer to a class of events that share common properties or attributes.

In accordance with one embodiment, a class can be identified either explicitly according to an event information (e.g., based on a unique message ID for each type of event) or implicitly from the text of a message associated with the event or other event attribute that can be used to identify the class to which an event may belong. For example, two events that report high temperature but state different temperatures may be associated with the same event type.

In one embodiment, a log type refers to a set of events stored together in a system. A system may log a variety of events in one or more different log types, for example (100). Depending on implementation, each log may be recorded in a separate storage area (e.g., Windows Security Event Log and Windows Application Event Log). In accordance with one embodiment, old messages are removed from a log if there is no room to store newly generated messages. Therefore, different log types may store histories for different time spans.

The events may be grouped into one or more sets according to similarity (110). For example, events may be grouped into sets according to event class or other common attribute associated with the events. In some embodiments, a textual representation of each event set is generated, whereby a single text line represents a set of similar messages using wildcards (e.g., "User * logged in successfully"). Optionally, a scalar value or several values are assigned to each event to indicate the importance of the event to the user based on message parameters. A scalar value, on the other hand, may be assigned to indicate the occurrence of an uncommon event. Evaluations for determining event importance or commonality may be based on other data recorded in the log or by way of comparing the content of the log with other logs or by way of statistical analysis.

Figure 2:
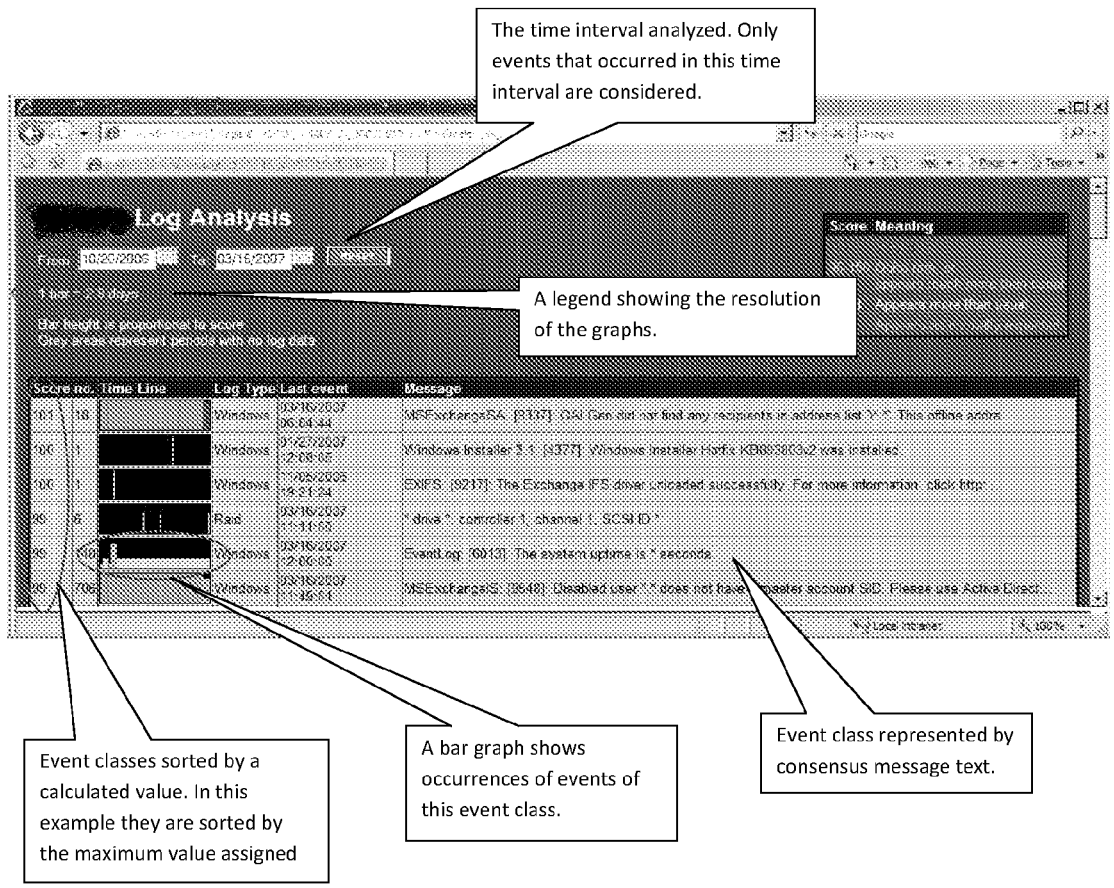

In certain embodiments, detailed information for each set of events is generated (120). Referring to FIG. 2, for example, a user interface that depicts the timing of the events in a set may be generated in the form of a bar user interface, wherein the x-axis represents time and the y-axis represents one of the values assigned to the events, for example. In some embodiments, the y-axis may represent time as well, for example, providing finer resolution for the timing of occurrence of an event. In such an implementation, the bar may be graphically presented as a series of tiles, wherein each tile in the height of the bar along the y-axis represents the number of times an event occurred in the time span represented by the width bar along the x-axis.

Advantageously, one or more bars may be displayed in color. A color code may be implemented to represent different values for each event, for example. Desirably, the background of the user interface may be filled with a different color to represent the area of the user interface that corresponds to a point in time preceding the earliest occurrence of an event belonging to a certain log type. This indicates to the user that it is unknown whether events that belong to the depicted event class occurred prior to this point in time. As noted, the above processes may be implemented to occur in a first state (e.g., an offline state) in which no user interaction is needed.

Figure 3:
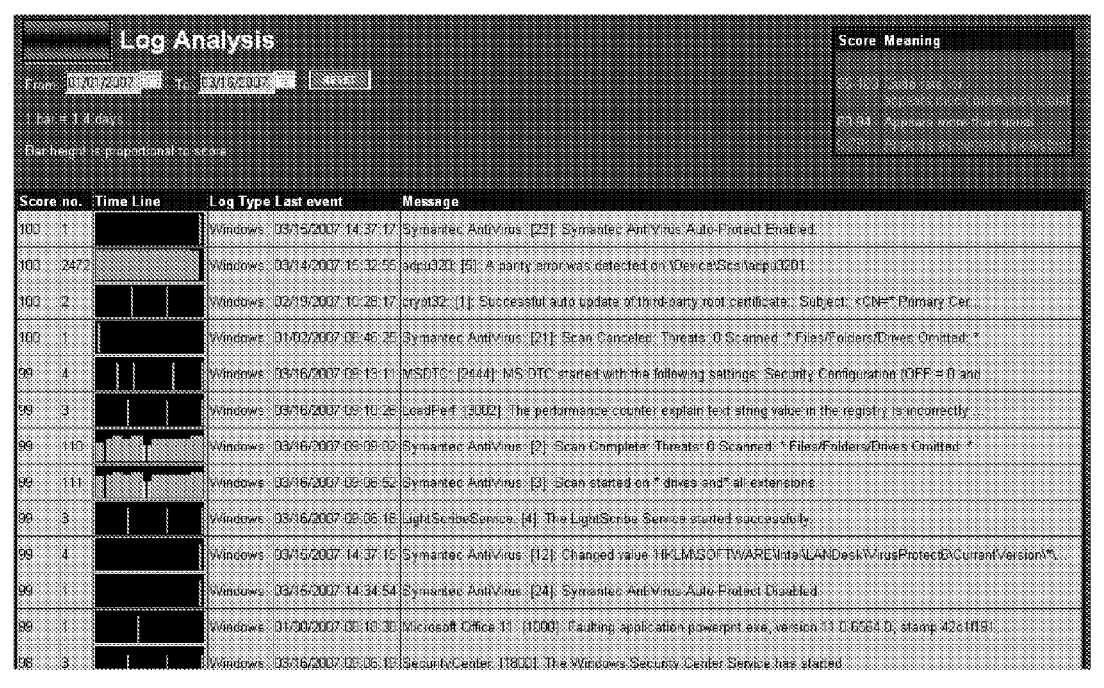

In a second state, the data analyzed and generated in the first state is utilized to provide an interactive user interface implemented to present time based information for different classes of events. In the exemplary implementations illustrated in FIGS. 2 and 3, the user interface is presented in the form of a table wherein a row represents an event class. Several columns are included in the table to provide detailed information for each event class. It is noteworthy that the illustrations in FIGS. 2 and 3 are provided by way of example. As such, depending on implementation, other data structures than a table may be utilized to graphically or non-graphically display the event details.

Some of the included details may comprise, for example, a textual representation of the event class, the time range associated with the event class, the number of events in the event class, other information pertaining to the set of events in a log. In certain embodiments, the rows may be sorted according to a predefined property or attribute associated with the event class (e.g., according to importance, log type, time of occurrence of the latest event, etc.). See FIGS. 2 and 3.

In one embodiment, a graphically displayed indicator (e.g., a mouse pointer) may be utilized to point to or hover over a data element (e.g., a bar, a tile) in the graphical user interface to activate a feature (e.g., display a tool-tip box) that provides additional information to a user. This feature may be implemented as a balloon, a box, or other conspicuous form of display that lists the events that are represented by the data element. The feature may also allow a user to zoom in on a selectable set of information for more detail. For example, a user may utilize a pointer to select a sub-section of the timeline (e.g., displayed in the third column). In response, the related information for the selected sub-section (i.e., time range) is displayed.

Referring back to FIG. 1, in certain embodiments, a time range controller is implemented to set a default time range for the events that are displayed in the graphical user interface (130). The default time range may be set to include a time span that covers the events analyzed in all or a selected portion of an event log. Accordingly, the displayable details for a relevant time range may be calculated and displayed (140-150). Desirably, the user may select a new time range by interacting with one or more features implemented in the graphical user interface (160).

In response to user interaction, the event details are updated in correspondence with the newly selected time range, so that the respective user interface in each row is updated to include information for the selected time range. Desirably, the resolution in the respective display area is changed accordingly. In this manner, more event details can be displayed in the same display area (e.g., column 3 of the table illustrated in FIGS. 2 and 3) when the user chooses a shorter timeline. Further, the number of events in each event class may be updated to include the events that occurred within the chosen time range.

To maintain efficiency of display real estate, rows associated with event classes for which no event occurred within the newly selected time range are removed or hidden. That is, rows may appear or disappear as the timeline changes, depending on whether any events were logged for the respective class of events in the selected time line. In one embodiment, the order in which the lines are displayed may change depending on whether more or less important events were logged in the newly selected time range. For example, if the sorting criteria depend on the events that occurred in each class, the display order of the rows representing each event may change to match the criteria when calculated for the events in the chosen range.

In some embodiments, a legend may be provided to indicate the length of time each bar or tile in the user interface represents. The legend may be updated according to the chosen time range. Advantageously, the events within a chosen time range may be displayed in various levels of detail, without eliminating any particular details or events, regardless of how unimportant or how infrequently said events occur. In this manner, a user will have access to a large scope of details and events, because the user has the option to focus in and out of a particular time range.

Furthermore, the details are presented in multiple levels to not complicate or interfere with the bigger picture, as the user has the option to broaden the scope of the subject time range, and view the events that are more important or happen more frequently by looking at easily noticeable bars or identifying custom colors and values that correspond to certain event classes or attributes.

Certain custom values may be assigned according to events characteristics (e.g., temperature or motor speed, severity, type of user, the time of day, etc.). Event attributes may be determined by compiling event statistics such as the count of events for a specific event class that occurred in a certain time frame (e.g., divide the whole time period into time frames of two days and in each count the number of occurrences of events of a certain class). The events in time frames with many occurrences may be scored higher, for example. Higher score events in time frames that exhibit an unusual number of occurrences may be determined by considering prior knowledge on the distribution of occurrences for each event class, for example.

In some embodiments, event classes can be defined by intrinsic properties of the events or by a pattern clustering method. Possible intrinsic event properties may include user name, internet protocol address range of for server, airport ID, or a system component initiating an event. A possible clustering method might group events with similar text description (e.g., the events "Server MEL3 restarted" and "Server ODY9 restarted" might be grouped into a cluster of events, hence defining an event class, named "Server * restarted".)

Referring to FIG. 3, a user by reviewing the content presented in the graphical user interface can determine a possible problem or defect. For example, the sixth and ninth rows show that the two event sets (represented by two bars in column three) occurred at the same time. This may indicate, for example, that the event in the ninth row, such as initiation of a certain service (e.g., LightScribe Service) caused the problem identified in the sixth row (i.e., an incorrect registry value).

Depending on implementation, it is possible that the present invention can take the form of an entirely hardware embodiment, an entirely software embodiment or an embodiment containing both hardware and software elements. A software embodiment may include, but not be limited to, to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Other components may be coupled to the system. Input/output or I/O devices (including but not limited to keyboards, displays, pointing devices, etc.) can be coupled to the system either directly or through intervening I/O controllers. Network adapters (e.g., modem, cable modem, Ethernet cards) may also be coupled to the system to enable the data processing system to become coupled to other data processing systems or remote printers or storage devices through intervening private or public networks.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may be comprise one or more modules that execute on one or more processors in a distributed, non-distributed, or multiprocessing environment.

The method as described above may be used in the fabrication of integrated circuit chips. The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multi-chip package (such as a ceramic carrier that has either or both surface interconnections or buried interconnections).

In any case, the chip is then integrated with other chips, discrete circuit elements, and/or other signal processing devices as part of either (a) an intermediate product, such as a motherboard, or (b) and end product. The end product can be any product that includes integrated circuit chips, ranging from toys and other low-end applications to advanced computer products having a display, a keyboard or other input device, and a central processor.

Therefore, it should be understood that the invention can be practiced with modification and alteration within the spirit and scope of the appended claims. The description is not intended to be exhaustive or to limit the invention to the precise form disclosed. These and various other adaptations and combinations of the embodiments disclosed are within the scope of the invention and are further defined by the claims and their full scope of equivalents.

What is claimed is:

1. A computer implemented method for visual representation of time based events in a target system, the method comprising:

analyzing, using one or more processors, content related to occurrence of one or more events in a target computing system, wherein the content is stored in a non-transient computer readable medium and the content comprises information, from which, type of an event and time of occurrence of the event may be determined;

utilizing the content information to determine number of times, duration and time of occurrence of each event in selected classes during a first time range;

grouping the events into one or more classes according to one or more predefined attributes; and generating a visual presentation of the events occurring in the first time range, wherein the first time range is selectable by an independent entity, wherein the visual presentation provides a list of events in said selected classes generated in form of a data structure in which each row represents an event class and at least one column represents the first time range during which said events took place, wherein occurrence of each of said events is designated by way of chronological indicators placed along the width of the time range column in each row, wherein relative alignment of the indicators across the time range column in at least two rows indicates that events associated with classes represented in said two rows occurred at relatively the same times in said first time range, wherein said indicators are color coded so that an event in a first class that occurs less than a first predetermined frequency for that first class is represented by an indicator of a first color, and the event in the first class that occurs more than the first predetermined frequency for that first class is represented by an indicator of a second color, wherein a score is calculated and assigned to at least a first row based on statistical analysis applied to at least one or more of the following:

number of events in a first event class assigned to said first row, importance level assigned to the first event class, log type associated with the first event class, and time of occurrence of latest event in the first event class, and wherein order of the rows in the data structure that represents the list of events is sorted based on the score calculated for a plurality of said rows, and the order of the rows is resorted when the first time range is updated.

2. The method of claim 1 wherein the visual presentation comprises a graphical representation of number of events occurring during the first time range.

3. The method of claim 1 wherein the visual presentation comprises a graphical representation of types of events occurring during the first time range.

4. The method of claim 1 wherein the visual presentation comprises a graphical representation of number of events or types of events occurring during the first time range, in association with a user interface mechanism allowing a user to cause more or less detailed information about an event's nature or time of occurrence to be displayed by way of interacting with the user interface mechanism.

5. The method of claim 4 wherein the visual presentation is updated, in response to the user interacting with the user interface mechanism, to display a graphical representation of the number of events and the types of events occurring during a second time range.

6. The method of claim 5 wherein the second time range is a subset of the first time range.

7. The method of claim 5 wherein the first time range is a subset of the second time range.

8. The method of claim 1 wherein the visual presentation comprises a graphical representation of types of events occurring during the first time range in association with a value representing importance of a respective event.

9. The method of claim 1 wherein the visual presentation comprises a graphical representation of types of events occurring during the first time range in association with a value representing time of occurrence of a respective event.

10. The method of claim 1 wherein the visual presentation comprises a graphical representation of types of events occurring during the first time range in association with a first value representing importance and a second value representing time of occurrence of a respective event, wherein order in which the events are displayed can be sorted in accordance with the first or the second values.

11. A computer-implemented system for visual representation of time based events in a target system, the system comprising:

logic code for analyzing content related to occurrence of one or more events in a target system, wherein the content comprises information from which type of an event and time of occurrence of the event may be determined;

logic code for utilizing the content information to determine number of times, duration and time of occurrence of each event in selected classes during a first time range;

logic code for grouping the events into one or more classes according to one or more predefined attributes; and logic code for generating a visual presentation of events occurring in the first time range, wherein the time range is selectable by an independent entity wherein the visual presentation provides a list of events in said selected classes generated in form of a data structure in which each row represents an event class and at least one column represents the first time range during which said events took place, wherein occurrence of each of said events is designated by way of chronological indicators placed along the width of the time range column in each row, wherein relative alignment of the indicators across the time range column in at least two rows indicates that events associated with classes represented in said two rows occurred at relatively the same times in said first time range, wherein said indicators are color coded so that an event in a first class that occurs less than a first predetermined frequency for that first class is represented by an indicator of a first color, and the event in the first class that occurs more than the first predetermined frequency for that first class is represented by an indicator of a second color, wherein a score is calculated and assigned to at least a first row based on statistical analysis applied to at least one or more of the following:

number of events in a first event class assigned to said first row, importance level assigned to the first event class, log type associated with the first event class, and time of occurrence of latest event in the first event class, and wherein order of the rows in the data structure that represents the list of events is sorted based on the score calculated for a plurality of said rows, and the order of the rows is resorted when the first time range is updated.

12. The system of claim 11 wherein the visual presentation comprises a graphical representation of number of events occurring during the first time range.

13. The system of claim 11 wherein the visual presentation comprises a graphical representation of types of events occurring during the first time range.

14. The method of claim 11 wherein the visual presentation comprises a graphical representation of number of events or types of events occurring during the first time range, in association with a user interface mechanism allowing a user to cause more or less detailed information about an event's nature or time of occurrence to be displayed by way of interacting with the user interface mechanism.

15. The system of claim 14 wherein the visual presentation is updated, in response to the user interacting with the user interface mechanism, to display a graphical representation of the number of events and the types of events occurring during a second time range.

16. The system of claim 15 wherein the second time range is a subset of the first time range.

17. The system of claim 15 wherein the first time range is a subset of the second time range.

18. The system of claim 11 wherein the visual presentation comprises a graphical representation of types of events occurring during the first time range in association with a value representing importance of a respective event.

19. The system of claim 11 wherein the visual presentation comprises a graphical representation of types of events occurring during the first time range in association with a value representing time of occurrence of a respective event.

20. The system of claim 11 wherein the visual presentation comprises a graphical representation of types of events occurring during the first time range in association with a first value representing importance and a second value representing time of occurrence of a respective event, wherein order in which the events are displayed can be sorted in accordance with the first or the second values.

21. A computer program product comprising a non-transient computer useable storage medium having a computer readable program, wherein the computer readable program when executed on a computer causes the computer to:
   analyze content related to occurrence of one or more events in a target system, wherein the content comprises information from which type of an event and time of occurrence of the event may be determined;
   utilize the content information to determine number of times, duration and time of occurrence of each event in selected classes during a first time range;
   group the events into one or more classes according to one or more predefined attributes; and
   generate a visual presentation of events occurring in the first time range, wherein the time range is selectable by an independent entity,
   wherein the visual presentation provides a list of events in said selected classes generated in form of a data structure in which each row represents an event class and at least one column represents the first time range during which said events took place, wherein occurrence of each of said events is designated by way of chronological indicators placed along the width of the time range column in each row,
   wherein relative alignment of the indicators across the time range column in at least two rows indicates that events associated with classes represented in said two rows occurred at relatively the same times in said first time range,
   wherein said indicators are color coded so that an event in a first class that occurs less than a first predetermined frequency for that first class is represented by an indicator of a first color, and the event in the first class that occurs more than the first predetermined frequency for that first class is represented by an indicator of a second color,
   wherein a score is calculated and assigned to at least a first row based on statistical analysis applied to at least one or more of the following:
      number of events in a first event class assigned to said first row,
      importance level assigned to the first event class,
      log type associated with the first event class, and
      time of occurrence of latest event in the first event class, and
   wherein order of the rows in the data structure that represents the list of events is sorted based on the score calculated for a plurality of said rows, and the order of the rows is resorted when the first time range is updated.

22. The computer program product of claim 21 wherein the visual presentation comprises a graphical representation of number of events occurring during the first time range.

23. The computer program product of claim 21 wherein the visual presentation comprises a graphical representation of types of events occurring during the first time range.

24. The computer program product of claim 21 wherein the visual presentation comprises a graphical representation of number of events or types of events occurring during the first time range, in association with a user interface mechanism allowing a user to cause more or less detailed information about an event's nature or time of occurrence to be displayed by way of interacting with the user interface mechanism.

25. The method of computer program product 24 wherein the visual presentation is updated, in response to the user interacting with the user interface mechanism, to display a graphical representation of the number of events and the types of events occurring during a second time range.

* * * * *